June 9, 1942.  G. INNES  2,286,095

PICKUP

Filed July 3, 1940

INVENTOR.
GEORGE INNES
BY
Merrill M. Blackburn.
ATTORNEY

Patented June 9, 1942

2,286,095

UNITED STATES PATENT OFFICE 2,286,095

PICKUP

George Innes, Davenport, Iowa

Application July 3, 1940, Serial No. 343,789

7 Claims. (Cl. 56—364)

My present invention relates to that class of devices which are used in the picking up of severed vegetation, primarily grain, although they are sometimes used for the picking up of hay. In this specification and the appended claims, I, therefore, use the term "grain" in a generic sense to indicate any vegetable matter which has been cut and which is capable of being picked up by a machine of this class.

Among the objects of this invention are to produce a machine of the character indicated which is easier to operate than a machine using rigid fingers or metal spring fingers; to produce a machine of the character indicated in which the noise of operation is reduced to a minimum; to produce a machine of the character indicated which will reduce to a minimum the number of stones picked up by the machine and delivered with the grain in its course of travel; and such further objects, advantages, and capabilities as will hereafter appear and as are inherent in the construction disclosed herein. My invention further resides in the combination, construction, and arrangement of parts illustrated in the accompanying drawing and, while I have shown therein what is now regarded as the preferred embodiment of this invention, I desire the same to be understood as illustrative only and not to be interpreted in a limiting sense.

In the drawing annexed hereto and forming a part hereof,

Figure 1:
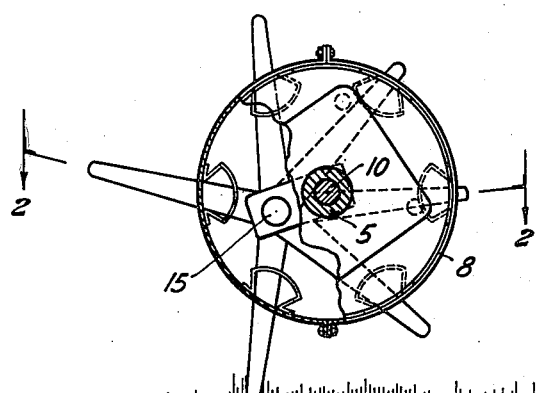
Fig. 1 represents a cross-section of the structure shown in Fig. 2 taken approximately along the plane indicated by the line 1—1 of that figure.

Heretofore there have been structures of the general nature of that covered by the present invention and, under some conditions, these have been eminently satisfactory. However, there are conditions under which prior structures are not satisfactory. For some time, pick-ups have been manufactured with rigid metal fingers and, when these pick-ups were used on stony ground, the fingers, when they would hit the stones, tended to throw these forwardly upon the grain, and then the stones would be picked up with the grain and delivered to the machine with which the pick-up was connected. This was particularly true if the grain was lying in windrows. Such stones would often be delivered to the cylinder of the threshing machine and would result in bending of the cylinder or concave teeth, if nothing worse. The rigid fingers hit the stones hard and hurl them farther than fingers made of a softer material. When wire fingers provided with coil springs are pulled taut and then released, they strike the stones with such force that the latter are picked up and thrown forward on the grain, whereas rubber fingers are released less violently and do not project the stones so far.

A further objection to spring fingers is that when they are deflected backwardly, the surface being smooth, they slip over the straw or the cut grain without picking it all up and, therefore, waste grain. The surface of the rubber fingers is highly tractile and serves much better to pick up the straw. Also, the rubber-like material is so constructed that its recoil, after being deflected, is slow until, in the arc of its movement, it is above the stone. Therefore, it will not operate in a way to pick up the stone and throw it. Furthermore, the rubber is more yielding when it strikes stones than is a solid metal finger, and there is, therefore, less rebound of the stones from the rubber fingers than from metal fingers.

A further advantage of the rubber fingers is that they reduce to a minimum the amount of noise produced by the machine, and this is very desirable to the user of the machine.

Further since the fingers of rubber-like material are more yieldable than rigid fingers or metal spring fingers, the construction is easier to operate, therefore requiring less power.

Reference will now be made in greater detail to the annexed drawing for a more complete description of this invention. The frame of the pick-up is denoted, in general, by the numeral 1. Bearings 2 and 3 are secured to the frame 1 and, in these bearings are rotatably mounted sleeves 4 and 5 which are connected to the end plates 6 and 7 of the pick-up drop 8. The sleeve 4 supports a stub-shaft 9 which has a collar 10 pinned to its outer end to prevent inward longitudinal movement of the shaft. The sleeve 4 may rotate relatively to the shaft 9.

A stub-shaft 9a, similar to the shaft 9, is supported in the sleeve 5 which may rotate relatively to the shaft and about the axis thereof. As in the case of the shaft 9, there is a collar pinned to the end of the shaft 9a to limit longitudinal movement thereof. Keyed or otherwise suitably secured to the sleeve 5 is a sprocket wheel 11 over which passes a chain 12. This is connected to a source of power and serves for the positive rotation of the drum 8. Arms 13 are rigidly secured to the inner ends of the shafts 9 and 9a so that these arms may be held in desired angular position with relation to the ground. The collars 10 may constitute parts of brackets 14, and thus serve to hold both shafts 9 and 9a against rotation, as is evident from Fig. 2 of the drawing.

Figure 2:
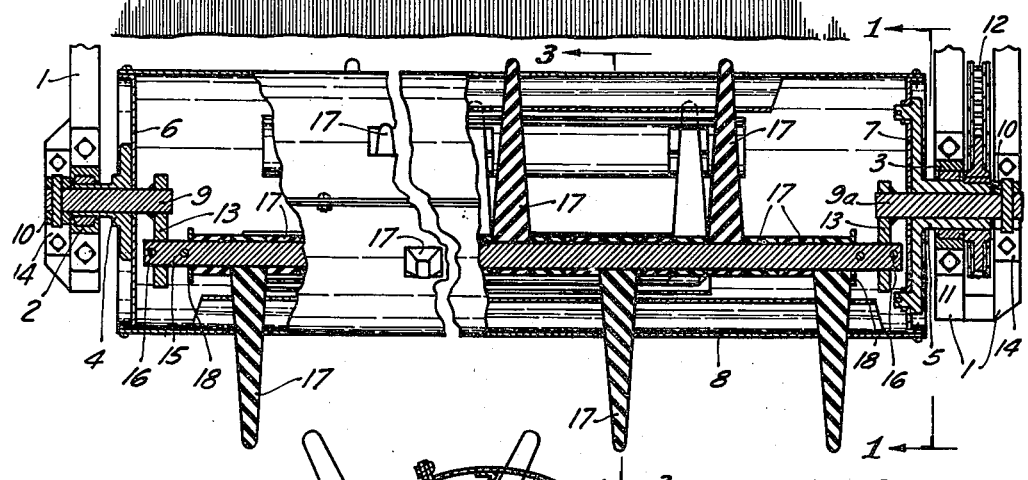
Fig. 2 represents a longitudinal section of a pick-up embodying my present invention, the same being taken approximately along the broken plane indicated by the line 2—2 of Fig. 1.
Figure 3:
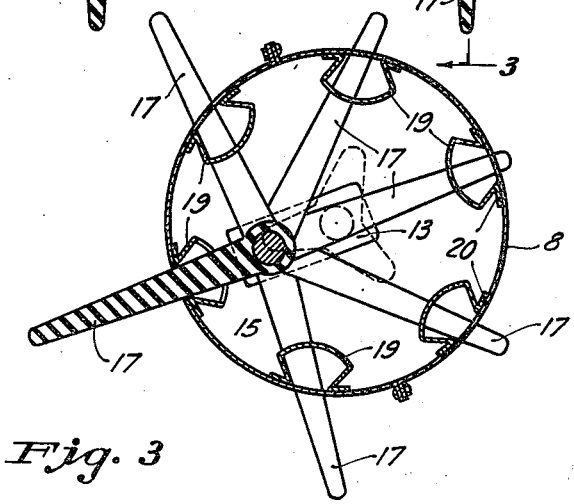
Fig. 3 represents a transverse section through the structure illustrated in Fig. 2, the same being taken approximately along the plane indicated by the line 3—3 of that figure.

The two ends of the shaft 15 are mounted in openings in the arms 13, which openings are eccentric with relation to the shafts 9 and 9a. Pins pass through the shaft 15 upon opposite sides of the arms 13, the outer ones being designated by the numeral 16 and being for the purpose of preventing more than minor endwise play of the shaft. On this shaft 15 are mounted fingers 17 made from rubber or rubber-like material. As shown in Figs. 2 and 3, these fingers are tapered outwardly from the shaft to their end portions, making them more readily flexible toward their outer ends than they are near the shaft. Each of these fingers is formed with a loop which surrounds the shaft and which, while fitting the shaft closely, yet does not fit it so closely that the two cannot rotate relatively to each other. Outside of the outer finger and fitting closely thereagainst is a washer 18 which is held against longitudinal movement on the shaft by the inside one of the two pins at each end of the shaft.

Secured to the inner surface of the cylindrical drum 8 are troughs 19 which are narrower at their outer, open portions than at their inner portions. These troughs 19 have laterally extending flanges 20 by means of which they are secured to the drum 8. Both the drum and the troughs are provided with openings through which the fingers 17 may extend, the openings in the troughs aligning with those in the drum but being larger than the latter. In the present drawing, these fingers are shown as being arranged in six rows and extending outwardly through the drum in a spiral arrangement. However, this arrangement is not essential, although I believe it to be the most desirable. At the present time, it is believed most desirable to secure the troughs to the drum by spot welding, although other means of securing them are possible and may be adopted within the scope of the appended claims. Other modifications also may be made within the scope of these claims.

It is to be understood that the shaft 15 must be eccentrically positioned with relation to the drum 8, and that this eccentric positioning is the function of the arms 13. The direction of inclination of the arms 13 determines the extent to which fingers 17 will be projected or retracted at the point in the cycle of rotation of the drum where the greatest extension of the fingers occurs.

The operation of the pick-up fingers of this invention is comparable to that of the fingers of my prior patents, No. 1,847,399, No. 1,896,626, and No. 2,133,143, but is very much better than the operation of such solid metal fingers for the reason that, as the pick-up drum rotates, the fingers engage the ground and are flexed and then do not recoil as rapidly as do the metal fingers. Therefore, stones are not picked up to such an extent by this structure and do not find their way into the threshing cylinder to the extent that they do when struck by metal fingers. So far as grain is concerned, these fingers have a greater tendency to lift the grain from the ground and carry it over the rotating drum to be delivered to a conveyor or threshing cylinder. The operation of the pick-up as a whole is disclosed in my patents, referred to above.

In the term "rubber-like material," I intend to include any plastic resilient material having the necessary qualities for the purpose indicated.

Having now described my invention, I claim:

1. In a pick-up, a curved shield, an axle extending longitudinally of the shield and positioned eccentrically with relation thereto, rubber fingers located along said axle and rotatable about the same, said fingers extending through said shield and projecting therefrom different amounts in different angular positions about the axle, and actuating means for causing rotation of said fingers about said axle.

2. In a pick-up, a curved shield, a plurality of rubber fingers, means within the shild for carrying the fingers for rotation about an axis unequally spaced from diverse points about said shield, and means for rotating said fingers about said axis whereby upon rotation of the fingers about the axis the fingers project from and retract into said shield.

3. In a pick-up, a curved shield, a means within the shield extending longitudinally thereof, positioned eccentrically with respect thereto and serving as an axis of rotation for fingers, a plurality of rubber fingers carried by said means and rotatable thereabout, said fingers when rotating about said means projecting unequal distances through said shield at different points in their course of rotation about said means, and means for causing rotation of said fingers about said means.

4. A structure as defined by claim 3 in which the shield has an axis of rotation about which it is rotatable, the axis of rotation of the fingers is eccentric with respect to the axis of the shield, and the fingers are tapered from their inner end portions to their outer extremities.

5. In a pick-up, a substantially cylindrical drum provided with axial trunnions about which it rotates, mechanism for rotating said drum, an axle eccentrically positioned with respect to said trunnions, and a series of rubber fingers mounted on said axle for rotation thereabout, said fingers fitting said axle closely but being able to move with relation thereto whereby to enable the fingers to rotate about the axle, the fingers tapering outwardly from the axle to their outer extremities, and said drum having openings through which the fingers may reciprocate as they rotate about the axle.

6. In a pick-up, a curved shield, means within the shield extending longitudinally thereof, positioned eccentrically with respect thereto and serving and an axis of rotation for fingers, a plurality of rubber fingers carried by said means and rotatable thereabout, said fingers when rotating about said means projecting unequal distances through said shield at different points in their course of rotation about said means, and means for causing rotation of said fingers about said means, said shield having an axis of rotation about which it is rotatable, and the axis of rotation of the fingers being eccentric with respect to the axis of the shield.

7. In a structure of the character described, a curved shield, supporting means within the shield extending longitudinally thereof, positioned eccentrically with respect thereto, and serving as a support for pick-up fingers, and a plurality of rubber pick-up fingers on said supporting means and revolving about an axis of revolution within the shield, said fingers flexing backwardly when encountering excessive backward resistance when being moved through a field.

GEORGE INNES.